US005714858A

United States Patent [19]

Pieralisi

[11] Patent Number: 5,714,858

[45] Date of Patent: Feb. 3, 1998

[54] DEVICE FOR CONTROLLING AND REGULATING THE RELATIVE SPEED BETWEEN ROTARY COMPONENTS INTERACTING WITH ONE ANOTHER RESPECTIVELY CONNECTED TO THE ROTOR AND STATOR OF AN ELECTRIC MOTOR

[75] Inventor: Gennaro Pieralisi, Jesi, Italy

[73] Assignee: Nuova M.A.I.P. Macchine Agricole Industriali Pieralisi S.P.A., Italy

[21] Appl. No.: 695,762

[22] Filed: Aug. 8, 1996

Related U.S. Application Data

[63] Continuation of Ser. No. 410,104, Mar. 24, 1995.

[51] Int. Cl.[6] .............................. B04B 1/20; H02K 23/48

[52] U.S. Cl. .............................. 318/539; 318/84; 388/903; 494/9; 494/84

[58] Field of Search .............................. 494/7, 9, 10, 53, 494/84, 26; 361/23; 388/902, 903, 904, 933, 833, 916; 318/68, 3, 84, 539, 466

[56] References Cited

U.S. PATENT DOCUMENTS

| | | | |
|---|---|---|---|
| 3,676,723 | 7/1972 | Drucker | 318/466 |
| 3,835,357 | 9/1974 | Holzer . | |
| 3,851,819 | 12/1974 | Tadokoro | 494/26 |
| 3,982,162 | 9/1976 | Ollife | 494/10 |
| 4,827,197 | 5/1989 | Giebeler | 318/3 |
| 5,203,762 | 4/1993 | Cooperstein | 494/7 |

FOREIGN PATENT DOCUMENTS

| | | | |
|---|---|---|---|
| 636419 | 3/1995 | European Pat. Off. . | |
| 4107485 | 9/1992 | Germany | B04B 9/08 |
| 2016306 | 9/1979 | United Kingdom | B04B 1/20 |

*Primary Examiner*—John W. Cabeca

*Attorney, Agent, or Firm*—Ladas & Parry

[57] ABSTRACT

A device for controlling and regulating the relative speed between the scroll (4) and drum (2) of a centrifugal extractor, comprising a dc or ac electric motor (10), stator (10*a*) of which is made integral with drum (2) and rotor (10*b*) of which is made integral with a gear (7) which drives scroll (4) via appropriate means (7*a*, 8*a*, 14*a*; 7*b*, 8*b*, 14*b*) of connection, there being furthermore provided means (30*a*, 30*b*) for detecting the speeds of rotation of such rotor (10*b*) and stator (10*a*) and for converting them into a representative electric signal, and means (40, 50) for comparing such electric signals designed to emit a signal ($D_{rs}$) capable of operating means (60; 1060) for supplying to rotor (10*b*) a current capable of compensating for any deviations of the parameters of the extractor from the programmed operating conditions.

6 Claims, 3 Drawing Sheets

Figure 2:
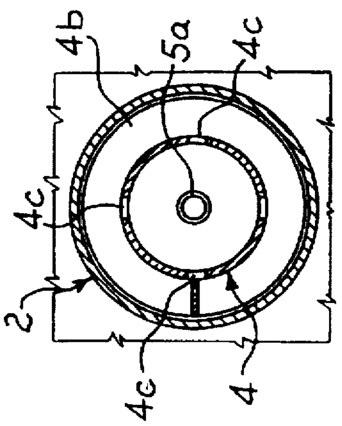

DEVICE FOR CONTROLLING AND REGULATING THE RELATIVE SPEED BETWEEN ROTARY COMPONENTS INTERACTING WITH ONE ANOTHER RESPECTIVELY CONNECTED TO THE ROTOR AND STATOR OF AN ELECTRIC MOTOR

This a continuation of copending application(s) Ser. No. 0/08/410,104 filed on Mar. 24, 1995.

This application originates from Italian Patent Application MI93A001691 Jul. 28, 1993 and European Patent Application 93202354.2 filed Aug. 10, 1993. Said documents are incorporated herein by reference.

The object of this invention is a device for the control and continuous regulation of the relative speed between the scroll and drum of a centrifugal extractor used for the separation of a solid from one or more fluids during the processing of products of various types. There are known in engineering machines called centrifugal extractors, substantially comprising a scroll fitted inside a rotary drum and in turn rotating in relation thereto, which bring about inside the drum the settlement and stratification of the various phases of the product comprising a solid phase and one or two liquid phases of different specific weight. During the relative movement between the scroll and the drum, and because of the presence of the product being processed, between the facing surfaces of the drum and the scroll there is generated friction and therefore a resistant torque, which is dependent upon the quantity of product located between the scroll and the drum, which quantity is in turn influenced by various parameters, such as the flow rate of the product being fed; the quality of the product being processed, which quality is represented in particular by the percentage of solid and by the specific weight of such solid; the speed of rotation of the drum and the relative speed between the drum and the scroll.

More specifically, under equal conditions of quantity and quality of the product being processed such torque is inversely proportional to the relative speed existing between the scroll and the drum.

However, whilst the quantity or flow rate of the product being processed can be easily regulated via a feed pump, the quality of the product resulting from processing upstream of the extractor is difficult to regulate, so that the resistant torque is subject to variations during operation, even where both the relative speed between scroll and drum and the feed rate are constant.

To this is added the possible occurrence of fortuitous circumstances which alter the normal operating regime, for example the ingress of undesirable foreign bodies which, by increasing friction between the scroll and the drum, may generate peaks of resistant torque between them.

Such variations therefore affect the stresses to which the mechanical parts of the machine are subjected and the system of transmission of movement from the motor to the drum and therefore to the scroll.

There are also known in engineering devices for the transmission of movement between the drum and the scroll which are designed according to a principle of rigid transmission, for example by a pulley, at a constant relative speed. In such cases, however, in order to vary the speed it is necessary to change the transmission ratio of the pulley-type rigid system with the machine at a standstill.

There are also known variable-speed drives involving the use of variators of mechanical or hydraulic type which, however, do not allow continuous regulation of the various parameters in order to maintain a constant yield in terms of both quantity and quality of the product at the outlet of the extractor.

There is therefore posed the technical problem of providing a device for controlling and regulating the operating parameters of a centrifugal extractor in order to maintain substantially stable the technological features of the product at the outlet of the machine, by adapting the controllable parameters of the centrifugal extractor to the features of the incoming product, while at the same time ensuring the operational safety of the machine in order to avoid breakage of the mechanical components, due for example to the fortuitous presence of foreign bodies in the product being processed.

Within the context of such problem it is furthermore desired to avoid the occurrence of clogging or reduction of efficiency of the centrifugal action due to variation of the features of the product entering into the said extractor.

Such technical problems are resolved according to this invention by a device for controlling and regulating the relative speed between the scroll and drum of a centrifugal extractor, comprising in combination an electric motor the stator of which is made integral with the drum and the rotor of which is made integral with a gear which drives the scroll via appropriate means of connection, there being furthermore provided means for detecting the speeds of rotation of the said rotor and stator and for converting them into a representative electric signal, means for comparing such electric signals designed to emit a signal capable of operating means for supplying to the rotor a current of value and characteristics determined by such signal and capable of compensating for any deviations of the parameters of the extractor from the programmed operating conditions, as well as means for programming the values of such parameters and for the control of safety circuits. Such electric motor may be of the direct-current type or of the alternating-current type.

Figure 1:
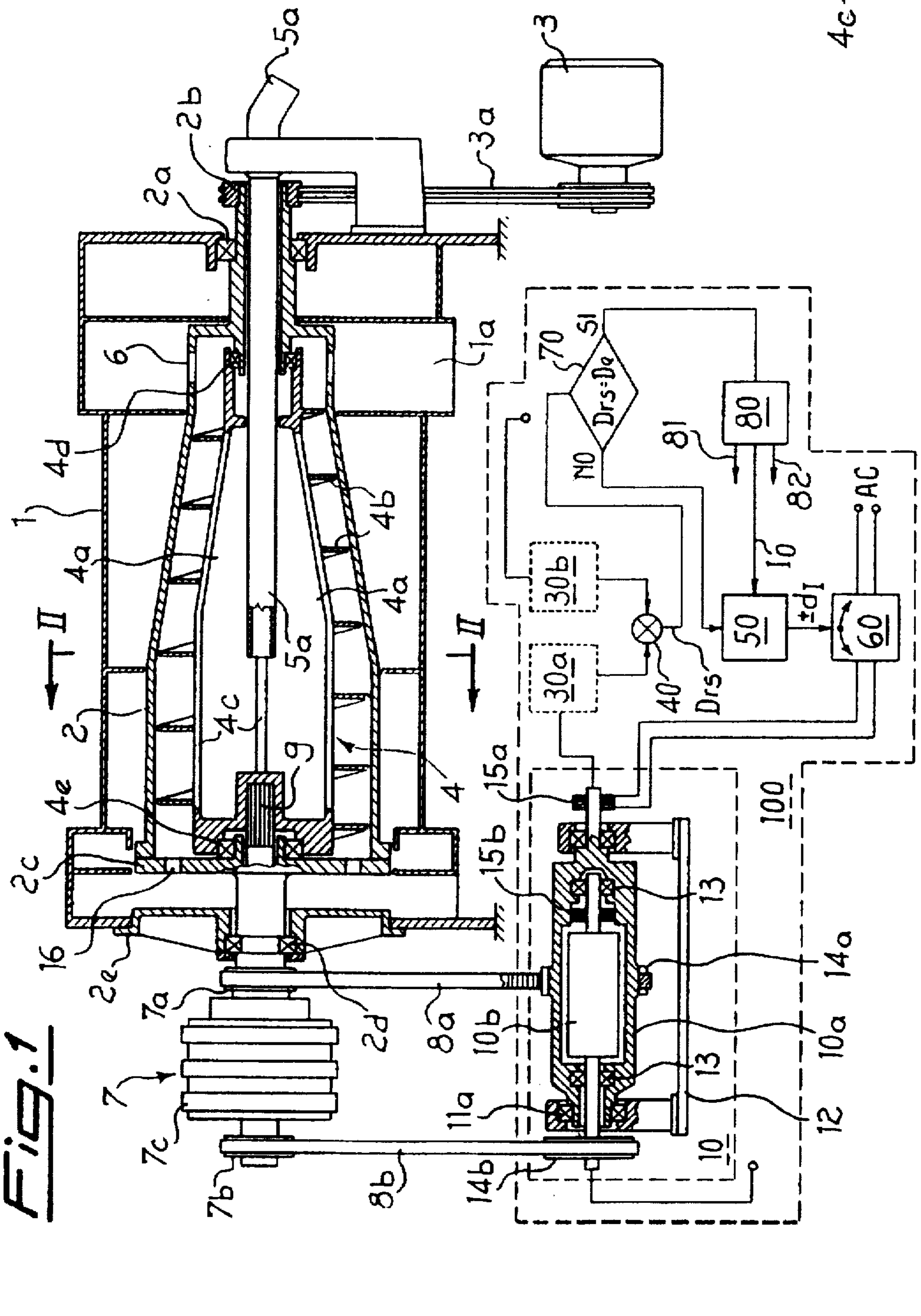
Figure 3:
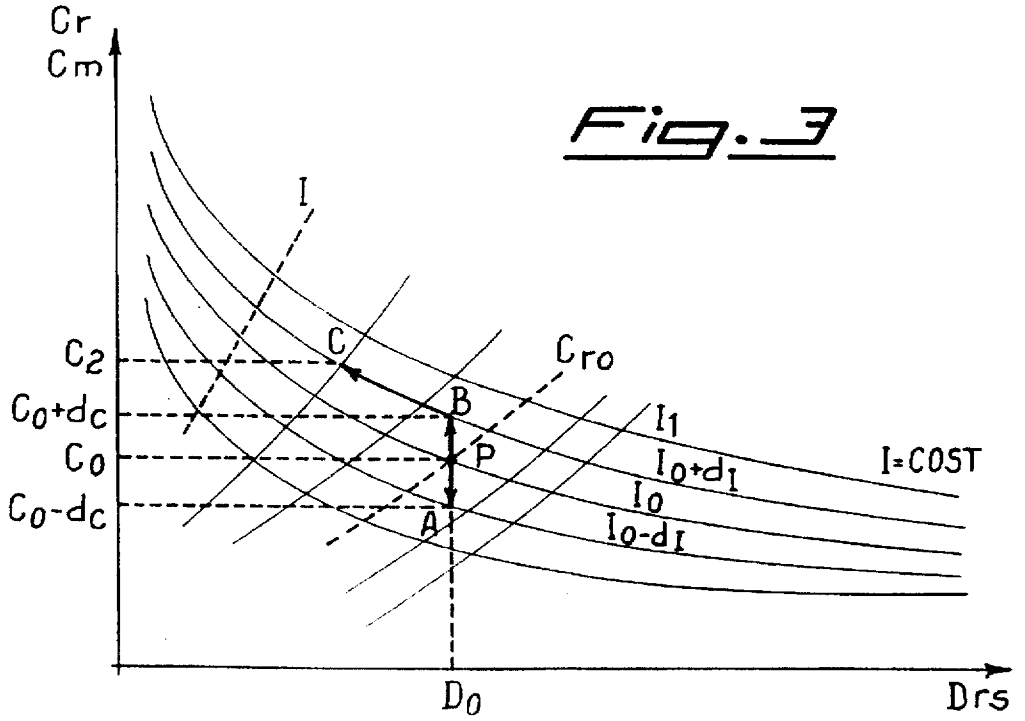
Figure 4:
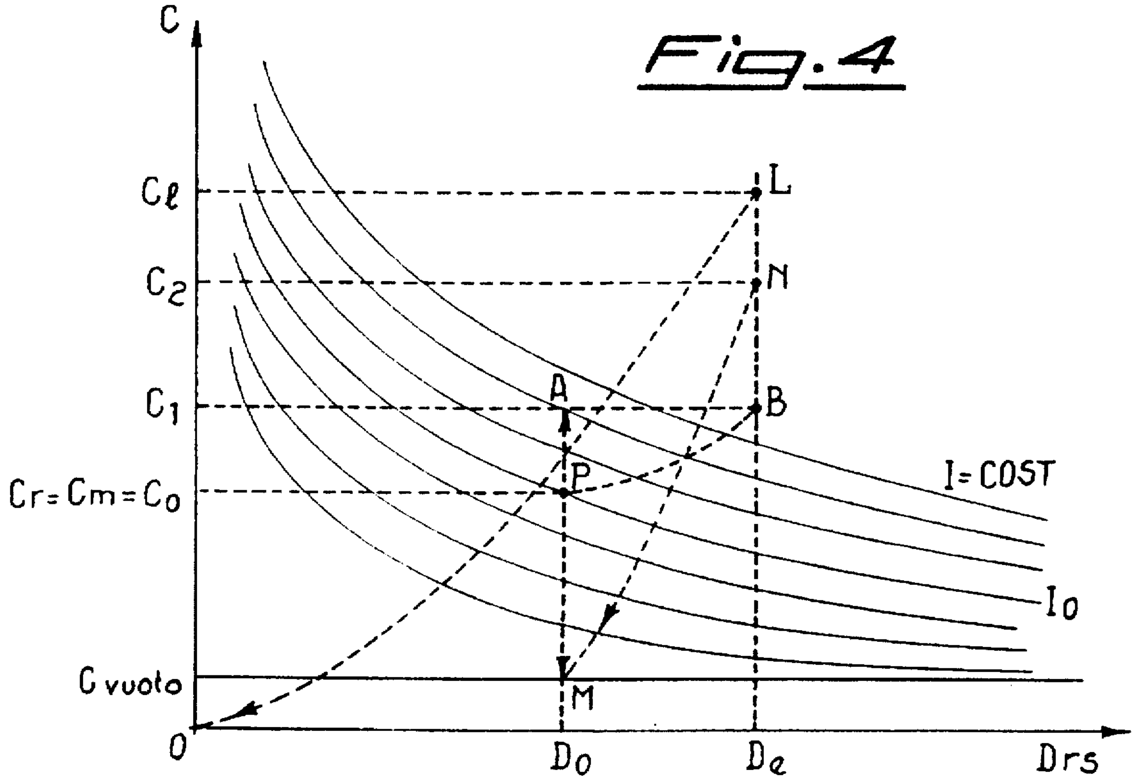
Figure 5:
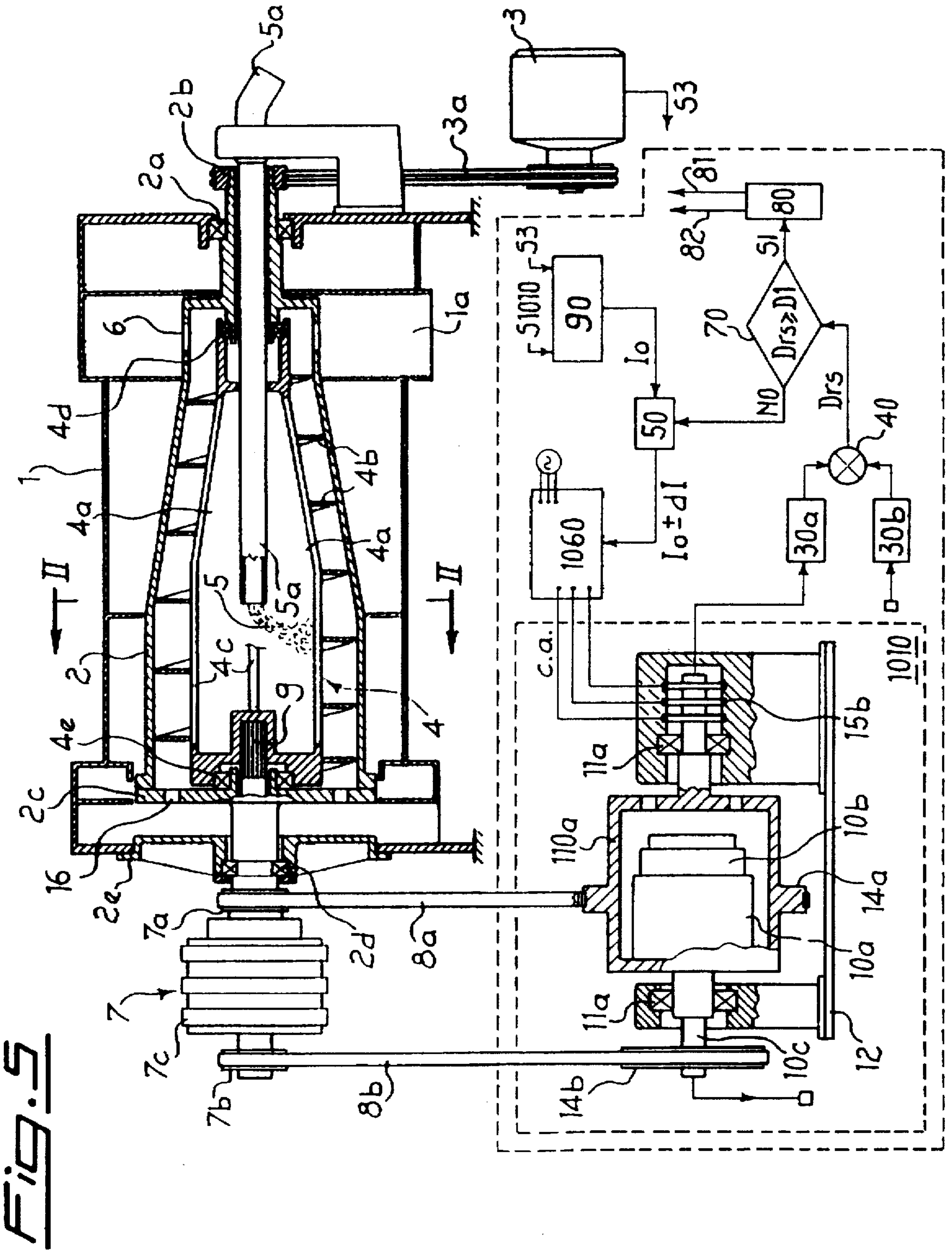

Further details and features of the device according to the invention will become clear from the following description of an example of implementation of a device according to the invention given with reference to the attached figures, which show:

In FIG. 1: a schematic section according to a vertical axial plane of a centrifugal extractor with a control and regulating device according to the invention;

In FIG. 2: a cross-section according to plotting plane II—II of the extractor in FIG. 1;

In FIG. 3: a Cartesian diagram illustrating the various types of regulation with assigned characteristics of the direct-current motor;

In FIG. 4: a diagram like that of FIG. 3 showing the critical points of operation and regulation;

In FIG. 5: the device in FIG. 1 with an alternating-current motor instead of a dc motor.

As shown in FIG. 1, a centrifugal extractor is comprised of a substantially cylindrical fixed housing 1, having approximately at one end an annular section open toward the bottom so as to form a radial outlet 1*a* from which the solid product is removed.

Inside fixed housing 1 and coaxially thereto is located a rotary hollow drum 2, of substantially truncated-cone shape, which is mounted at its driving end on a bearing 2*a* to allow rotation relative to housing 1, while the said drum drive consists of a pulley 2*b* actuated by belts 3*a* driven by a motor 3.

Inside drum 2 and coaxially thereto is also located a scroll 4, substantially consisting of a truncated-cone body formed by circumferential segments 4*a* made integral with one another in order to form longitudinal slots 4*c* for the outflow of product 5 supplied via a pump, not illustrated, and a duct 5*a* which enters into the body of the scroll, on the outer surface of which is made integral a spiral 4*b*, the purpose of which will be more clearly explained later. Such scroll is supported at the opposite ends by bearings 4*d* and 4*e* made integral with drum 2, in relation to which scroll 4 may rotate as described hereinafter.

The centrifugal extractor is also provided with outlets 16 for the metered outflow of the liquid phases.

At the end opposite the driving end, drum 2 is made integral—via end-closing disc 2*c* the hub of which rests on bearing 2*d* supported by wall 2*e*—with housing-crown 7*c* of an epicyclic-type gear 7 to which it imparts movement with an equal number of turns, such movement then being taken up by a pulley 7*a* via a belt 8*a* which, as will be more clearly described later, is in turn connected to control and regulating device 100 according to the invention.

To such device 100 is furthermore connected a further belt 8*b* which, via a pulley 7*b* of gear 7, drives a shaft (not illustrated) acting on the satellites of epicyclic gear 7, which in turn operate the secondary shaft of the gear to bring about the rotation of splined shaft 9 which drives scroll 4.

The different number of rotations of the scroll relative to the drum is determined by the ratio of rotation of gear 7 and of device 10, as well as by the dimensions of the two pairs of pulleys 7*a*, 14*a* and 7*b*, 14*b* connected therewith via appropriate belts 8*a*, 8*b*.

Control and regulating device 100 is substantially comprised of a direct-current electric motor 10 consisting of a stator 10*a* supported via bearings 11*a* by a fixed support 12. Stator 10*a* supports in turn coaxial rotor 10*b* via bearings 13.

On the outer surface of stator 10*a* is made integral a toothed pulley 14*a* capable of engaging belt 8*a* by means of which stator 10*a* is made to rotate by drum 2.

To shaft 10*c* of rotor 10*b* is furthermore made integral a pulley 14*b* capable of engaging belt 8*b* which, as stated, actuates the shaft of epicyclic gear 7 and hence, via the latter, brings about the rotation of scroll 4.

As is apparent from the foregoing description, while rotor 10*b* is made to rotate by the dc supply provided by brushes 15*a* and 15*b* which receive current from the mains via a feeder 60, which is more clearly described later, stator 10*a* is instead made to rotate by belt 8*a* and hence by drum 2.

Control and regulating device 100 furthermore comprises two tachometric dynamos 30*a*, 30*b* or the like, respectively connected to the shafts of stator 10*a* and rotor 10*b*, capable of generating current in proportion to the respective speeds of rotation.

The two current signals are then input to a summating device 40 at the output of which there is obtained a signal $D_{rs}$ representing the difference in speed of rotation between rotor 10*b* and stator 10*a*. Such signal $D_{rs}$ is sent to a device 70, for example of programmed type, which subjects it to an initial verification of the value and substantially distinguishes two cases:

- a first case in which the difference in speed of rotation $D_{rs}$ is lower than a preset safety value $D_1$, whereupon signal $D_{rs}$ is sent to a comparator 50 which compares it with a reference value $I_o$ relative to the preset conditions of regime of the entire device, resulting in a positive or negative output signal $d_I$ capable of operating feeder 60, which will then supply a current of predetermined value and direction in order to compensate in either direction for any deviations of the speeds of rotation from the preselected values of equilibrium.
- a second case in which, the value of $D_{rs}$ being instead equal to or greater than such safety limit $D_1$, there is activated a programmable circuit 80 which may act, for example, by bringing about a rapid reduction of reference value $I_o$ at the input to comparator 50 in order to deactivate the device totally or partly so as to prevent damage to the electrical and/or mechanical parts, as will be more clearly explained later with reference to the description of operation of the device. There being therefore known the law which governs the differences in speed of rotation $D_{rs}$ between rotor 10*b* and stator 10*a* and $D_{sc}$ between drum 2 and scroll 4—which law may for example be of linear type—it is possible to programme values of rated operation and of safety limit condition of the entire device to ensure correct operation thereof by simply checking and regulating the operating conditions of device 100.

The operation of the extractor is as follows:

The solid fed via duct 5*a* enters into hollow scroll 4 and, on emerging from slots 4*c*, is stratified by centrifugal action on the extreme peripheral zone of drum 2 having a greater specific weight relative to the liquid phase, or to the two liquid phases, which are stratified on the solid according to their specific weight.

The fluids flow out in a metered manner via outlets 16 while the solid is conveyed to outlet 6 via spiral 4*b* of scroll 4, which has a relative movement of rotation with respect to drum 2, the direction of relative rotation being closely linked to the direction of the helical surface and yet such as to cause the solid product to advance toward outlet 6 and hence 1*a*.

Along this route the solid passes through the truncated-cone section and is therefore dehydrated by centrifugal action.

More specifically and with reference to FIG. 3 it will be seen that control of the various operating parameters of the extractor is performed by means of the device represented schematically in the inset marked 100, through which, there being known characteristic curve I=COST. of the direct-current motor, there is identified point of operation P of the system on the Cartesian plane (C, $D_{rs}$) and by acting subsequently on the power supply to the device it is possible to control the operation of the extractor by varying the conditions of equilibrium of the device.

A dynamic disturbance, represented for example by an increase or reduction of density of the product, effectively brings about a corresponding alteration of resistant torque $C_r$ and therefore of the relative speed between the scroll and the drum, represented as to the various moments by points A, B and C of such Cartesian plane (C, $D_{rs}$) respectively corresponding to conditions of:

- reduction of current ($I_o-d_I$) following reduction of the resistant torque (point A);
- increase of current ($I_o+d_I$) following increase of the resistant torque (point B);
- increase of the resistant torque and of the driving torque with constant value of current $I_o$ (point C) with no intervention of the control and regulating device.

In the first two cases, the variations are carried out by the control and regulating device in order to maintain constant the kinematic conditions of operation of the extractor, for example by maintaining unchanged the relative scroll/drum speed. In the third case, however, the regulating device does not come into operation and the dc electric motor is self-regulated in the appropriate direction to bring about a reduction of the relative speed between the scroll and the drum by reducing the number of revolutions.

The response of the device may however also be different and yet programmable according to the type of process and regulation which it is desired to apply to the machine. There may for example be required a response at variable relative speed between the scroll and the drum because there is desired a well-defined law of variation as a function of the values of resistant torque.

The device according to the invention may also be used for settings applied directly to the machine. Such setting is normally achieved by acting on the feed pump or, where applicable, on the motor of a positive-displacement pump in order to regulate the quantity of product supplied to the extractor, or in certain cases to interrupt In flow. In this manner the device is also capable of effecting safety control in that it acts on the processing sequence in such a way as to prevent a situation of danger and/or overload of the mechanical components of the machine.

FIG. 4 represents a comprehensive example of regulation of the centrifugal extractor. On a Cartesian plane (C, $D_{rs}$) there is represented the characteristic curve of a centrifugal extractor equipped with a control and regulating device according to the invention.

Point of equilibrium P represents the operating condition of the centrifugal extractor with a driving torque equal to resistant torque $C_0$ at relative speed $D_0$ and preset energizing current $I_0$.

If resistant torque $C_r$ should vary as a result of an external disturbance, regulating device 100 reacts in such a way as to maintain constant relative speed $D_0$ by varying the energizing current of motor 10 upon changing the value of $C_m$ according to line $D_{rs}=D_0$, that is, at constant relative speed.

However, on attaining a preset limit value $D_1$ of difference in revolutions, the device activates such programmable unit 80 (FIG. 1) which, via outlets 81, 82 and auxiliary circuits, not illustrated, acts in various ways. If, for example, the operating torque exceeds value $C_l$ (point A) which represents a preset limit value, there occurs a different type of programmable setting which may, for example, act in such a way as to maintain the torque constant by increasing the energizing current and therefore the relative speed between the scroll and the drum up to point B ($D_{rs}=D_1$), which represents a further programmable limit value of the relative speed between the drum and the scroll.

If, however, the conditions of increase of resistant torque persist, the regulating device still reacts with an increase in driving torque, but maintaining constant the relative speed between the drum and the scroll which is already at limit value $D_1$, until there is attained value $C_2$ (point N) representing the limit condition, at which point the regulating device comes into operation and stops the product feed pump by causing the centrifugal extractor to operate under safe no-load running conditions (point M) at a relative speed corresponding to value $D_0$.

From point B, corresponding to the maximum relative speed between the scroll and the drum, the regulating device may however act in a different mode from that described above, by regulating the speed of rotation of the product feed pump.

In such event the feed rate is gradually reduced until the resistant torque returns to the value corresponding to original operating point P, at which it resumes normal operation.

The centrifugal extractor may however, due to fortuitous circumstances, also exceed torque limit value $C_2$ and therefore reach point L, corresponding to permissible torque limit value $C_1$. In such event the system reacts by cancelling the energizing current and at the same time inhibiting the feed pump, thus operating under conditions of relative speed $D_{rs}=0$ and torque C=0, that is, at point 0 of origin of the coordinates of the Cartesian plane.

It is therefore clear from the description given above that with the control and regulating device according to the invention it is possible to regulate the operation of a centrifugal extractor of known type by acting on the various available parameters in order to obtain preset conditions of equilibrium which will provide the best results, both qualitative and quantitative, while at the same time making it possible to ensure programmable conditions of safety which can be easily varied when the characteristics of the extractor and/or of the product being processed vary.

As shown in FIG. 5, control and regulating device 100 may be designed according to an alternative form of operation which substantially provides for the replacement of the dc motor with an alternating-current motor 1010 the stator 10a of which is made integral with a housing 110a which is supported via bearings 11a from fixed support 12. Stator 10a in turn supports the coaxial rotor to which is keyed shaft 10b.

To the outer surface of rotary housing 110a is made integral toothed pulley 14a which is capable of engaging belt 8a, by means of which stator 10a is made to rotate by drum 2.

To shaft 10c of rotor 10a is furthermore made integral a pulley 14b capable of engaging belt 8b which, as stated, actuates the shaft of the epicyclic gear and therefore, by means of the latter, brings about the rotation of scroll 4.

As will be seen from the foregoing description, while shaft 10b integral with the rotor of motor 1010 is made to rotate by the ac supply provided by brushes 15b which receive current from the mains via a frequency converter 1060, which is more clearly described later, stator 10a integral with housing 11Oa is instead made to rotate by belt 8a and hence by drum 2.

As in the example of FIG. 1, control and regulating device 100 furthermore comprises two tachometric dynamos 30a, 30b, respectively connected to the shafts of the stator and rotor, capable of generating current in proportion to the respective speeds of rotation. The two current signals are then input to a summating device 40 at the output of which there is obtained a signal $D_{rs}$ representing the difference in speed of rotation between rotor 10b and stator 10a.

Also in the case of the ac motor, such signal $D_{rs}$ is first compared by means of a circuit 70 with preset limit value $D_1$ in such a way that, when the value of $D_{rs}$ equal to or greater than preset value $D_1$ the device brings into action safety circuits 80 as previously described. If, however, the value of $D_{rs}$ comes within the preset safety limits, the signal is sent to a comparator 50 which compares it with a reference value $I_0$ relative to the preset conditions of regime of the entire device, resulting in a positive or negative output signal $d_1$ capable of operating frequency converter 1060 which will supply an alternating current of suitable frequency in order to compensate in either direction for any deviations of the speeds of rotation from the preselected values of equilibrium.

In the case of an alternating-current motor, reference signal $I_0$ is however established by means of a programmable logic circuit 90 also on the basis of two further reference variables, S3 and S1010, respectively representing the overload of motor 3 which drives drum 2 and ac control motor 1010.

It is intended that many variants shall be capable of being applied to the constructional details of the device according to the invention without thereby departing from the scope of its essential features.

I claim:

1. A device for controlling and regulating the relative speed between a scroll and a drum of a centrifugal extractor, said device comprising:

an alternating-current electric motor, a stator of which is made integral with a housing which in turn is connected in rotation with the drum, and a rotor of which is made integral with a gear which drives the scroll via appropriate means of connection;

means for programming values of parameters of operating conditions of the extractor;

means for detecting the speeds of rotation of said rotor and said stator and for converting the detected speeds respectively into representative electric signals;

means for comparing said electric signals to emit a differential signal capable of driving means for supplying a current to said rotor, the direction and value of said current being determined by said differential signal and capable of compensating for any deviations of the parameters of the extractor from the programmed operating conditions; and means for controlling safety circuits.

2. A device according to claim 1 wherein the means of connection between the housing which supports the stator and the drum comprise a toothed pulley integral with said housing and a pulley integral with the drum, the pulleys being connected to one another by means of a belt.

3. A device according to claim 1 wherein the means of connection between the rotor and the gear for driving the scroll comprise a pair of pulleys, respectively integral with the gear and the rotor, said pulleys being connected to one another by means of a belt.

4. A device according to claim 1 wherein the means for comparing the electric signals corresponding to the different speeds of rotation of the rotor and the stator comprise a summating device capable of generating a signal representing the difference in speed between the rotor and the stator, and a comparator capable of receiving said incoming signal and comparing it with a reference value of regime providing as output a current value proportional to the difference between the input signals and of sign conforming therewith.

5. A device according to claim 1 wherein the means for supplying current to the rotor comprise a frequency converter capable of being operated by said differential signal and of supplying a current the frequency of which is proportional to said signal.

6. A device according to claim 1 wherein the means for detecting the speed of rotation of the rotor and the stator and for converting the speeds into a corresponding electric signal comprise a pair of tachometric dynamos independent of one another and respectively integral with the shafts of the rotor and the stator.

* * * * *